United States Patent
Abele et al.

(10) Patent No.: US 6,952,973 B2
(45) Date of Patent: Oct. 11, 2005

(54) METHOD FOR ATTACHING A TORQUE MEASURING DEVICE

(75) Inventors: Wolfgang Abele, Spraitbach (DE); Matthias Fahrian, Bartholomae (DE); Gerhard Ruf, Huettlingen (DE); Stefan Froehlich, Zimmerbach (DE); Werner Habbel, Freiburg (DE); Thomas Weese, Mutlangen (DE); Anton Wettemann, Schwaebisch Gmuend (DE); Christoph Ziller, Waldstetten (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/479,071
(22) PCT Filed: May 24, 2002
(86) PCT No.: PCT/EP02/05686
§ 371 (c)(1), (2), (4) Date: Nov. 25, 2003
(87) PCT Pub. No.: WO02/099374
PCT Pub. Date: Dec. 12, 2002

(65) Prior Publication Data
US 2004/0144187 A1 Jul. 29, 2004

(30) Foreign Application Priority Data
Jun. 1, 2001 (DE) .......................... 101 26 791

(51) Int. Cl.[7] .................................................. G01L 3/02
(52) U.S. Cl. .................................................. 73/862.191
(58) Field of Search ........................ 73/862.08, 862.17, 73/862.191

(56) References Cited

U.S. PATENT DOCUMENTS

| | | | |
|---|---|---|---|
| 4,382,308 A | * | 5/1983 | Curcio .......................... 15/77 |
| 4,953,411 A | * | 9/1990 | Coenen et al. .......... 73/862.324 |
| 5,040,631 A | | 8/1991 | Lang et al. |
| 6,000,491 A | | 12/1999 | Shimizu et al. |
| 6,026,941 A | * | 2/2000 | Maienschein et al. ..... 192/3.29 |
| 6,301,975 B1 | | 10/2001 | Chikaraishi |
| 6,341,534 B1 | * | 1/2002 | Dombrowski .......... 73/862.333 |
| 6,382,034 B1 | | 5/2002 | Yasui et al. |
| 6,691,819 B2 | * | 2/2004 | Menjak et al. .............. 180/446 |

FOREIGN PATENT DOCUMENTS

| | | |
|---|---|---|
| DE | 199 08 459 | 9/1999 |
| DE | 100 42 593 | 8/2001 |
| EP | 0 366 691 | 11/1991 |
| JP | 8-240493 | 9/1996 |

* cited by examiner

*Primary Examiner*—Max Noori
(74) *Attorney, Agent, or Firm*—Kenyon & Kenyon

(57) ABSTRACT

In a method for fastening a torque measurement device for detecting a relative torque between an input shaft and an output shaft of a steering system, e.g., of a rack-and-pinion power-assisted steering system, the torque measurement device is integrally formed locally into the input shaft and/or the output shaft by deformation elements.

24 Claims, 2 Drawing Sheets

METHOD FOR ATTACHING A TORQUE MEASURING DEVICE

FIELD OF THE INVENTION

The present invention relates to a method for fastening a torque measurement device for detecting a relative torque between an input shaft and an output shaft. The present invention also relates to an input shaft and/or output shaft for performing the method.

BACKGROUND INFORMATION

In steering systems, in particular in power-assisted steering systems, in which manual steering is assisted by an electric motor, an exact, reliable and permanent detection of a relative torque between an input shaft and an output shaft is particularly important for ascertaining the steering requirement. The torque measurement device used for detection is in this case generally installed between an input shaft, which is connected to a steering spindle connection, and an output shaft, which is connected to a pinion. The torque measurement device thus detects the relative torque between the steering spindle connection or input shaft and the pinion or output shaft and controls the drive of an electric motor via an electronic module. The electric motor may in this case serve for the power assistance of the conventional steering apparatus.

As regards the operating principle of a rack-and-pinion power-assisted steering system, reference is made, in this regard, to European Published Patent Application No. 0 366 691.

A method, conventional from practice, for fastening a torque measurement device to an input shaft and an output shaft of a steering system provides, in this context, for the torque measurement device to be welded to the input shaft and the output shaft. It became clear in this case, however, that this welded joint is complicated and not sufficiently reliable. A break of the weld seam may occur, for example, when the wrong material is welded. Since the torque measurement device is a safety-relevant element which is to operate with high precision and reliably, the fastening method must satisfy particularly stringent demands and possibilities of error must be ruled out as far as possible.

It is an aspect of the present invention to overcome disadvantages of the prior art, in particular to provide a method of the type initially mentioned, which allows an accurate, reliable and permanent fastening of a torque measurement device between an input shaft and an output shaft of a steering system and may be performed in a favorable and simple manner and which may largely rule out error sources which may lead to a release of the connection.

SUMMARY

Since the torque measurement device is integrally formed locally into the input shaft and/or the output shaft by deformation elements, a reliable, permanent and exact connection is obtained, which virtually rules out an inadvertent release of the torque measurement device, for example due to the choice of wrong material. Moreover, the method can be carried out simply, quickly and cost-effectively. The connection is corrosion-proof, vibration-proof, temperature-resistant, resistant to physical influences, etc.

The connection made by the method according to an example embodiment of the present invention may have, moreover, particularly high strength. The torque measurement device may be fastened exactly in the intended position.

It may be provided that even materials which may not be welded to one another may be connected. A choice of the materials to be processed which is determined by welding criteria may therefore be dispensed with. According to an example embodiment of the method, fastening may also be performed particularly cost-effectively because round parts may be connected to one another without any previous form fit.

An adverse heating of the components involved during the assembly process or contamination, such as may have occurred relatively frequently in a conventional method may be reliably prevented by the method according to an example embodiment of the present invention. Furthermore, there is no need to use further additional connection elements, such as, for example, pins, clips, etc.

A secondary effect of the fastening of the torque measurement device to the input shaft or the output shaft which may be performed reliably in terms of the process may be that, if appropriate, even repeated connection, particularly with regard to hardened shafts, and therefore reuse are possible.

The torque measurement device may be connected, free of play, to the input shaft or output shaft, so that it is possible, for example by an electric motor, to assist the predetermined steering requirement exactly and in a simple manner.

Furthermore, according to an example embodiment of the present invention, there may be provision for the torque measurement device to have a magnetic ring and a sensor which are integrally formed into the input shaft or the output shaft by the deformation elements.

By the torque measurement device being arranged with a magnetic ring, which may be fastened to an input shaft, and with a sensor for fastening to an output shaft, the relative torque between the input shaft and the output shaft may be picked up in a simple manner. The torque and, from this, the necessary assisting force provided by the electric motor may be determined with the aid of other parameters from the angular rotation which is ascertained.

The input shaft and/or the output shaft may be provided with reception points for receiving the material of the torque measurement device which is to be integrally formed locally, and the reception points may be arranged as depressions, countersinks, bores, etc.

By the reception points in the input shaft and/or the output shaft, the torque measurement device or the magnetic ring and/or the sensor may be fastened to the input shaft or to the output shaft in a simple manner. This may result in a form-fitting connection which arises from a form-fitting and frictional assembly operation. In this case, it may be sufficient if one of the two parts to be connected, in this case the input shaft and/or the output shaft, has, before the assembly operation, the possibility of the subsequent form fit.

Fastening the torque measurement device according to the method can be carried out with particularly little effort, exactly, quickly and permanently by the reception points. Flexibility in the mounting or setting of the torque measurement device is not influenced in the least in this case, since the torque measurement device is designed without a previous form fit and can therefore be oriented or attached in any desired manner. Only after an appropriate actuation of the deformation elements, which integrally forms the material of the torque measurement device locally into the reception points, is there the desired permanent and reliable connection between the torque measurement device and the input or output shaft.

The force of the deformation elements which is to be applied for connection is reduced substantially by the reception points, with the result that it is possible to adhere to the intended position particularly accurately.

In an example embodiment of the present invention, there may be provision for the torque measurement device to be integrally formed by a deep-drawing process.

An embodiment of this type has proved to be particularly reliable in terms of the process and to be simple to carry out.

For integral forming, three deformation elements arranged as deformation rams are provided, and the number and position of the reception points and of the deformation rams may be adapted to one another.

By the deformation elements being arranged with three deformation rams and by correspondingly adapted reception points, a secure and reliable fastening of the torque measurement device may be possible, which, furthermore, may be carried out quickly and cost-effectively. For this purpose, the reception points may be introduced into the shaft so as to be offset in each case at 120°.

In an example structural embodiment of the connection, there may be provision for the integral forming of the torque measurement device to be checked by force/path monitoring.

By force monitoring, a connection which may be particularly reliable in terms of the process is possible, since, for example, metal sheets which are too thin or material defects are detected due to the lower resistance. Furthermore, the path monitoring ensures that, even when increased resistance occurs, the metal sheet is introduced into the reception points in the intended way or, if the intended path distance is not reached, the part is not freed.

An input shaft and/or output shaft for carrying out the method is described below.

Further refinements and developments of the present invention may be gathered exemplary embodiment illustrated below, in principle, with reference to the drawings.

DETAILED DESCRIPTION

Figure 1:
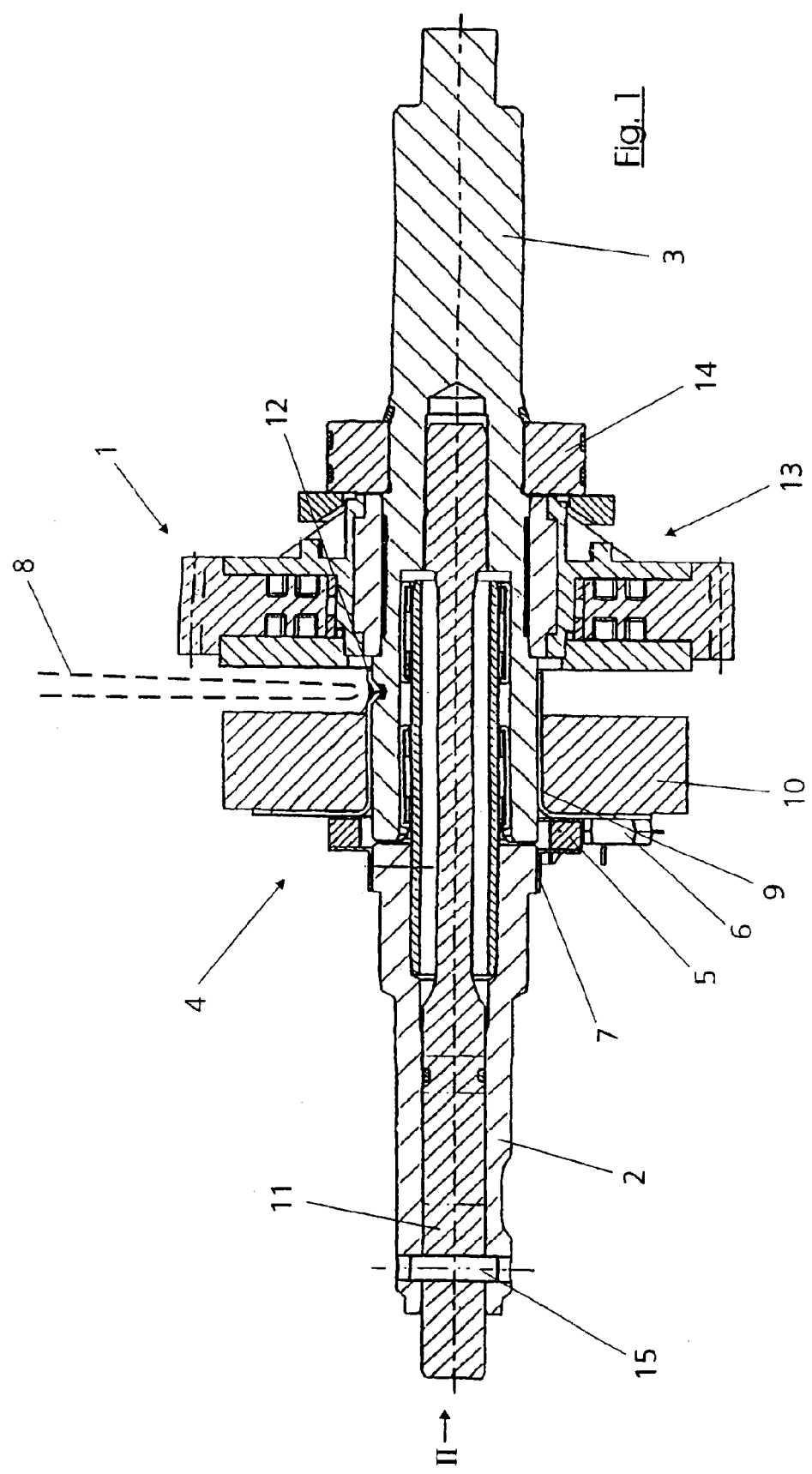
FIG. 1 is a cross-sectional view through a torque measurement device which is integrally formed into an input shaft and an output shaft of a steering system.

FIG. 1 shows part of a steering system 1, in particular of a rack-and-pinion power-assisted steering system, with essentially an input shaft 2, an output shaft 3 and a torque measurement device 4.

The input shaft 2 is in this case connected, via a steering spindle connection to a steering handle for transmitting a steering requirement. The output shaft 3 forms a drive pinion which is in engagement with a rack in the usual manner. The rack may be connected in a conventional manner to steerable wheels via a steering linkage.

As is evident from FIG. 1, the torque measurement device 4 is fastened or installed both on the input shaft 2 and on the output shaft 3. The torque measurement device 4 can thus detect a relative torque between the input shaft 2 and the output shaft 3 or between the steering spindle connection and the drive pinion. By means of the relative torque which is detected, an electric motor is controlled via an electronic module.

As illustrated in FIG. 1, the torque measurement device 4 has a magnetic ring 5 and a sensor 6. In the exemplary embodiment illustrated, the magnetic ring 5 is arranged on a cylindrical sheet-metal ring 7 which, according to the method, is integrally formed locally into the input shaft 2 by deformation elements 8 indicated merely in principle (see FIG. 3). In a similar way to this, the sensor 6 is arranged on a holding plate 9 by means of spiral springs 10 and is integrally formed into the output shaft 3 by means of the deformation elements 8.

An arrangement of the magnetic ring 5 on the input shaft 2 and of the sensor 6 on the output shaft 3 may be provided for measuring the angle of rotation between the input shaft 2 and the output shaft 3. In an alternative example embodiment there may also be provision for the arrangement of the magnetic ring 5 and of the sensor 6 to be reversed.

As may be customary in hydraulic steering systems, the input shaft 2 and the output shaft 3 are connected to a torsion bar 11. The torque can thus be calculated via the torsion bar rigidity and the measured angle of rotation.

Figure 2:
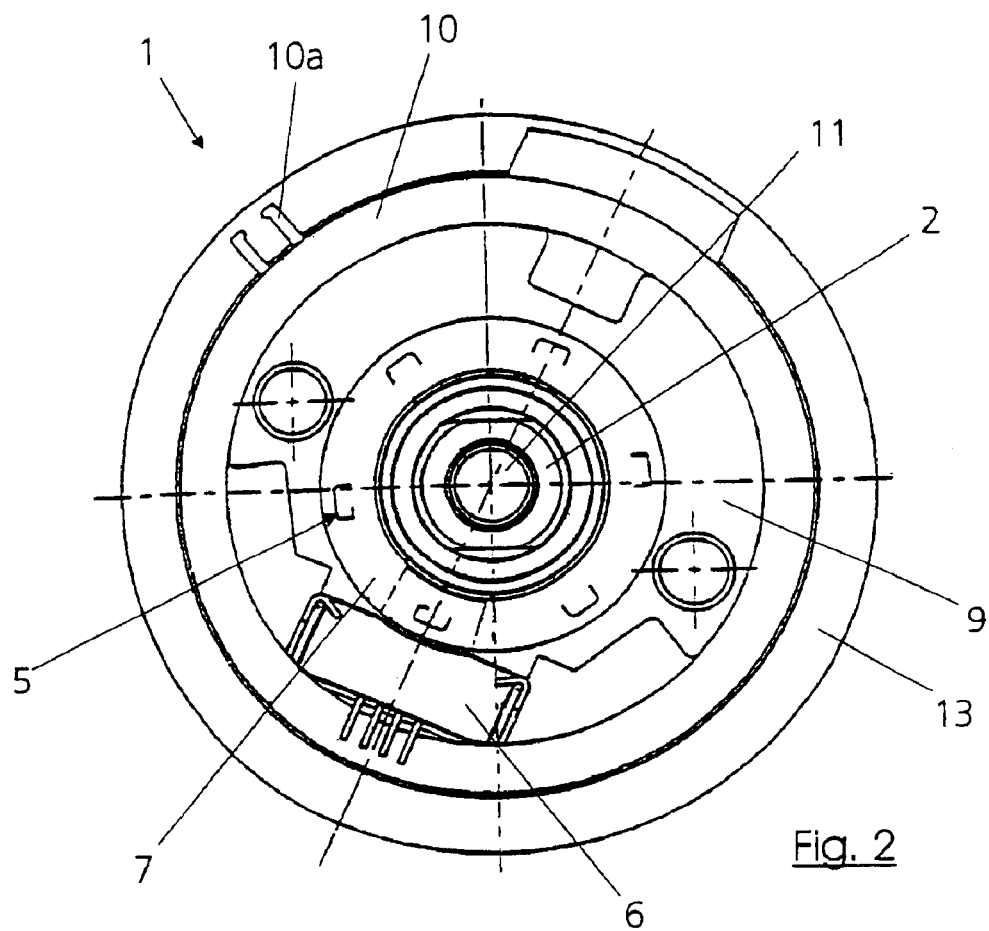
FIG. 2 is a view in the direction of the arrow II illustrated in FIG. 1

An arrangement of the sensor 6 with the holding plate 9 in relation to the magnetic ring 5 with the cylindrical sheet-metal ring 7 is illustrated in FIG. 2.

Figure 3:
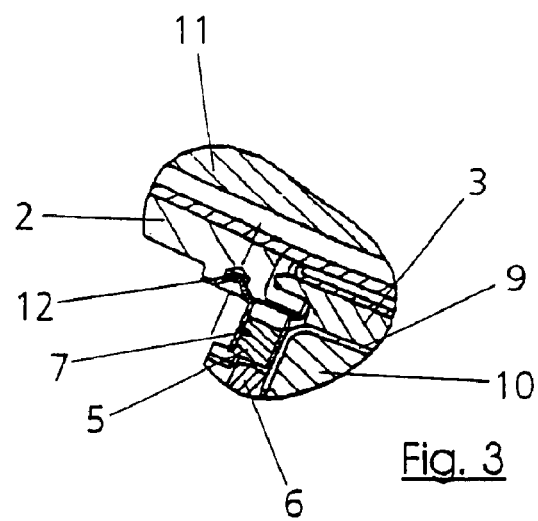
FIG. 3 is an enlarged illustration of a magnetic ring which is arranged on a sheet-metal ring and which is caulked with the input shaft.

For integral forming of the holding plate 9 into the output shaft 3 or for the local integral forming of the cylindrical sheet-metal ring 7 into the input shaft 2, reception points 12 may be provided in the output shaft 3 (FIG. 1) and in the input shaft 2 (FIG. 3). The reception points may be arranged as depressions, countersinks, bores 12, etc. and may receive the material of the torque measurement device 4 which is to be integrally formed locally. An inadvertent displacement or juddering of the torque measurement device 4 set or oriented exactly before deformation may thus be largely reduced.

A integral forming of the cylindrical sheet-metal ring 7 or the holding plate 9 into the input shaft 2 or the output shaft 3 is possible, using three deformation elements which are arranged correspondingly uniformly around the input shaft 2 or the output shaft 3. A design of the deformation elements as deformation rams 8 may be provided. The number and position of the bores 12 may in this case be adapted in a simple manner to the deformation rams 8. The input shaft 2 and the output shaft 3 which are illustrated in the exemplary embodiment consequently in each case have three bores 12 which are arranged in each case so as to be offset at 120°.

The bores 12 are designed as cylindrical bores with countersinks. A bore diameter of 1 to 4 mm, e.g., 2 to 3 mm, a bore depth of 1 to 3 mm, e.g., 1.5 to 2 mm, a countersink at 45° and a countersink depth of, e.g., 0.5 to 1 mm may be suitable in tests with regard to rapid, cost-effective, accurate and permanent integral forming. The edge between the countersink and the cylindrical part of the bore 12 is responsible for freedom from play. A large part of the holding forces is transmitted via this edge. A 10% clearance in the bore depth may be provided for ensuring the material flow.

As regards the bore 12, care must be taken to ensure that the bore onset is not sharp-edged. The countersink may makes it possible that the material of the cylindrical sheet-metal ring 7 or the holding plate 9, said material being deep-drawn into the bore 12, is not sheared off. The local integral forming of the material of the cylindrical sheet-metal ring 7 or of the holding plate 9 according to the method may be checked by force/path monitoring. A deep-drawing process may be suitable for integral forming.

FIG. 3 shows fastening of the magnetic ring 5 to the input shaft 2 and of the sensor 6 to the output shaft 3 which has been carried out by an example embodiment of the method according to the present invention.

That part of a steering system 1 which is illustrated in FIG. 1 and FIG. 2 conventionally has, in addition to the components already described, a worm 13, a bearing 14 and a connecting pin 15 which connects the torsion bar 11 to the input shaft 2.

The functioning of the worm 13 and of the bearing 14 are sufficiently conventional.

The use of a spiral spring 10 is generally conventional, in principle. The spiral spring 10 may be provided with the ribs 10*a*, illustrated in FIG. 2, for protection against rotation.

In principle, it is not necessary to use a spiral spring 10 for signal transmission, and other methods and/or arrangements, for example contactless transmission methods and/or arrangements, may also be used for this purpose.

There are various measurement principles by which an angle of rotation between a magnetic ring 5 and a sensor 6 may be determined or detected.

An example embodiment of the method provides, in a first method step, for aligning the deformation rams 8 and the bores 12 with one another. This may ensure that the deformation rams 8 and the bores 12 are correctly aligned with one another. Subsequent mutual alignment, e.g., when the torque measurement device 4 is already positioned, may thus be avoided and, consequently, an unintentional displacement of the torque measurement device 4 is prevented.

The deformation rams 8 therefore advance first, without the torque measurement device 4 being arranged, in the direction of the input shaft 2 or the output shaft 3, are aligned with the bores 12 and subsequently move back again.

In a second method step, the holding plate 9 having the sensor 6 is applied to the output shaft 3 and is integrally formed locally into the bores 12 of the output shaft 3 by the deformation rams 8. Since the holding plate 9 is a round part without a previous form fit, it can be applied to the output shaft 3 in a simple manner. A positioning exact to a hundred percent is not absolutely necessary in this case.

The sensor 6 may also be applied to the input shaft 2 in the manner described. In a further alternative example embodiment, in which the following method steps may have to be adapted correspondingly, there may also be provision first for fastening the magnetic ring 5 with its cylindrical sheet-metal ring 7 to the input shaft 2 or the output shaft 3 and subsequently for positioning and fastening the sensor 6 in the sensor 6 in relation to the magnetic ring 5.

In a third method step, the deformation rams 8 are then applied to the not yet occupied or still free reception points. This takes place, in principle, in a similar manner to the first method step already described. For this purpose, depending on the arrangement, either the same deformation rams 8 or another unit of deformation rams 8 may be used.

In a fourth method step, after the fastening of the sensor 6, the cylindrical sheet-metal ring 7 together with the magnetic ring 5 is applied to the input shaft 2 and is set or positioned in relation to the sensor 6 fixed in the second method step.

In a fifth method step, the cylindrical sheet-metal ring 7 together with the magnetic ring 5, positioned in the fourth method step, is integrally formed into the bores 12 of the input shaft 2 by means of the deformation rams 8. After the integral forming process, the deformation rams 8 can be drawn back again.

The fastening according to the method gives rise to a permanent connection of the torque measurement device 4 to the input shaft 2 or the output shaft 3, said connection being reliable in terms of the process. The method according to an example embodiment of the present invention may be used for materials currently available in this sector, e.g., for sheet steel, sheet brass, VA sheet, etc. The use of sheet brass or VA sheet as materials may provide corrosion resistance.

By means of the method described, magnets can also be fastened to a worm. The magnet then serves, here, for detecting the rotational speed of a motor and does not have to be set.

We claim:

1. A method for fastening a torque measurement device for detecting a relative torque between an input shaft and an output shaft of a steering system, comprising:

integrally forming the torque measurement device locally into at lease one of the input shaft and the output shaft by deformation elements.

2. The method as claimed in claim 1, wherein the steering system includes a rack-and-pinion power-assisted steering system.

3. The method according to claim 1, wherein the torque measurement device includes a magnetic ring and a sensor, the method further comprising integrally forming the magnetic ring and the sensor into one of the input shaft and the output shaft by the deformation elements.

4. The method according to claim 3, further comprising:

arranging the magnetic ring on a cylindrical sheet-metal ring; and integrally forming the cylindrical sheet-metal ring into the input shaft by the deformation elements.

5. A method for fastening a torque measurement device for detecting a relative torque between an input shaft and an output shaft of a steering system, comprising:

integrally forming the torque measurement device locally into at least one of the input shaft and the output shaft by deformation elements, the torque measurement device including a magnetic ring and sensor;

integrally forming the magnetic ring and the sensor into one of the input shaft and the output shaft by the deformation elements;

arranging the sensor on a holding plate by a spiral spring; and integrally forming the holding plate into the output shaft by the deformation elements.

6. The method according to claim 1, wherein at least one of the input shaft and the output shaft includes a reception point arranged to receive material of the torque measurement device to be integrally formed locally.

7. The method according to claim 6, wherein the reception point includes at least one of a depression, a countersink and a bore.

8. The method according to claim 6, further comprising aligning the deformation elements and the reception point.

9. A method for fastening a torque measurement device for detecting a relative torque between an input shaft and an output shaft of a steering system, comprising:

integrally forming the torque measurement device locally into at least one of the input shaft and the output shaft by deformation elements, at least one of the input shaft and the output shaft including a reception point arranged to receive material of the torque measurement device to be integrally formed locally;

aligning the deformation elements and the reception point;

integrally forming one of:

(a) a sheet-metal ring and a magnetic ring of the torque measurement device; and (b) a holding plate and a sensor of the torque measurement device; into the reception point of one of the input shaft and the output shaft by the deformation elements.

10. A method for fastening a torque measurement device for detecting a relative torque between an input shaft and an output shaft of a steering system, comprising:

integrally forming the torque measurement device locally into at least one of the input shaft and the output shaft by deformation elements, at least one of the input shaft and the output shaft including a reception point arranged to receive material of the torque measurement device to be integrally formed locally, the reception point including at least one of a depression, a countersink and a bore; and aligning the deformation elements with an unoccupied reception point.

11. The method according to claim 9, further comprising applying to one of the input shaft and the output shaft and one of setting and positioning in relation to the one of the magnetic ring and the sensor integrally formed in the integral forming step:

(a) the sheet-metal ring and the magnetic ring; and (b) the holding plate and the sensor.

12. The method according to claim 11, further comprising integrally forming into the reception point of one of the input shaft and the output shaft by the deformation elements the one of (a) the sheet-metal ring and the magnetic ring and (b) the holding plate and the sensor applied in the applying step.

13. The method according to claim 1, wherein the torque measurement device is integrally formed in the integrally forming step by deep-drawing.

14. A method for fastening a torque measurement device for detecting a relative torque between an input shaft and an output shaft of a steering system, comprising:

integrally forming the torque measurement device locally into at least one of the input shaft and the output shaft by deformation elements;

wherein the deformation elements include three deformation rams.

15. The method according to claim 14, wherein a number and position of reception points on at least one of the input shaft and the output shaft arranged to receive material of the torque measurement device to be integrally formed locally correspond to a number and position of the deformation rams.

16. A method for fastening a torque measurement device for detecting a relative torque between an input shaft and an output shaft of a steering system, comprising:

integrally forming the torque measurement device locally into at least one of the input shaft and the output shaft by deformation elements; and checking the integral forming of the torque measurement device by force/path monitoring.

17. A device, comprising:

at least one of an input shaft and an output shaft arranged for integral formation of a torque measurement device locally into the at least one of the input shaft and the output shaft by deformation elements, the torque measurement device configured to detect a relative torque between the input shaft and the output shaft, the at least one of the input shaft and the output shaft including reception points arranged to receive material of the torque measurement device to be integrally formed.

18. The device according to claim 17, wherein the reception points include at least one of a countersink, a depression and a bore.

19. A device comprising:

at least one of an input shaft and an output shaft arranged for integral formation of a torque measurement device locally into the at least one of the input shaft and the output shaft by deformation elements, the torque measurement device configured to detect a relative torque between the input shaft and the output shaft, the at least one of the input shaft and the output shaft including reception points arranged to receive material of the torque measurement device to be integrally formed;

wherein the reception points include three cylindrical bores offset at 120° and countersinks.

20. A device comprising:

at least one of an input shaft and an output shaft arranged for integral formation of a torque measurement device locally into the at least one of the input shaft and the output shaft by deformation elements, the torque measurement device configured to detect a relative torque between the input shaft and the output shaft, the at least one of the input shaft and the output shaft including reception points arranged to receive material of the torque measurement device to be integrally formed;

wherein the reception points include a bore diameter of 1 to 4 mm, a bore depth of 1 to 3 mm, and a countersink at 45°.

21. The device according to claim 20, wherein the bore diameter is 2 to 3 mm.

22. The device according to claim 20, wherein the bore depth is 1.5 to 2 mm.

23. The device according to claim 20, wherein a countersink depth is 0.5 to 1 mm.

24. The method according to claim 1, wherein the forming step includes deformation of the deformation elements.

* * * * *

UNITED STATES PATENT AND TRADEMARK OFFICE
CERTIFICATE OF CORRECTION

PATENT NO. : 6,952,973 B2
DATED : October 11, 2005
INVENTOR(S) : Abele et al.

It is certified that error appears in the above-identified patent and that said Letters Patent is hereby corrected as shown below:

Column 1,
Line 57, change "is obtained, which virtually rules out" to -- may be obtained, which may virtually rule out --;
Line 59, change "the method can" to -- the method may --;
Line 60, change "connection to corrosion-proof" to -- connection may be corrosion-proof --;

Column 2,
Line 14, change "there is no need" to -- there may be no need --;
Line 54, change "can be carried out" to -- may be carried out --;
Line 57, change "device is not influenced" to -- device may not be influenced --;

Column 3,
Line 9, change "rams are provided" to -- rams may be provided --;
Line 30, change "the intended way" to -- the intended manner --;
Line 35, change "may be gathered the exemplary embodiment" to -- may be gathered from the exemplary embodiment --;
Line 44, change "in FIG 1" to -- in FIG 1. --;
Line 62, change "device 4 can thus" to -- device 4 may thus --;
Line 65, delete "means of";

Column 4,
Line 35, change "A integral forming" to -- An integral forming --;
Line 37, change "is possible," to -- may be possible, --;
Line 57, change "care must be taken" to -- care may be taken --;
Line 59, change "makes it possible" to -- make it possible --;

Column 5,
Line 28, change "is prevented." to -- may be prevented. --;
Line 37, change "can be applied" to -- may be applied --;
Line 39, change "is not absolutely necessary" to -- may not be absolutely necessary --;
Line 63, delete "means of";
Line 64, change "rams 8 can be" to -- rams 8 may be --;
Line 66, change "method gives rise" to -- method may give rise --;

UNITED STATES PATENT AND TRADEMARK OFFICE
CERTIFICATE OF CORRECTION

PATENT NO. : 6,952,973 B2
DATED : October 11, 2005
INVENTOR(S) : Abele et al.

It is certified that error appears in the above-identified patent and that said Letters Patent is hereby corrected as shown below:

Column 6,
Line 1, change "said connection" to -- the connection --;
Line 7, change "can also be" to -- may also be --;
Line 9, change "does not have" to -- may not have --; and
Line 38, change "a magnetic ring and sensor;" to -- a magnetic ring and a sensor; --.

Signed and Sealed this

Twenty-fifth Day of April, 2006

JON W. DUDAS
*Director of the United States Patent and Trademark Office*